Patented June 4, 1940

2,202,845

UNITED STATES PATENT OFFICE 2,202,845

DENATURED ALCOHOL CONTAINING ALDOL

Louis J. Figg, Jr., Kingsport, Tenn., assignor to Eastman Kodak Company, Rochester, N. Y., a corporation of New Jersey No Drawing. Application October 6, 1937, Serial No. 167,616

1 Claim. (Cl. 202—77)

This invention relates to the denaturing of ethyl alcohol, and to alcohol so denatured.

It is an object of my invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. Other objects will hereinafter appear.

I have discovered that a lower aliphatic aldehyde selected from the group consisting of aldol, $CH_3.CH(OH).CH_2.CHO$, butyl aldehyde $C_3H_7.CHO$, and paraldehyde, $C_6H_{12}O_3$, is an effective denaturant for alcohol. A particular advantage of aldol as a denaturant is that when alcohol containing it is heated in an attempt to eliminate the denaturant, the aldol breaks down to give crotonaldehyde, which renders the alcohol even more undrinkable. In denaturing ethyl alcohol with my novel denaturants, I may use from 0.5 to 5 parts of the lower aliphatic aldehyde, or even more, per 100 parts of 95% alcohol.

These lower aliphatic aldehydes may be used alone in denaturing, or they may be used in conjunction with denaturing materials derived from the destructive distillation of hardwood, such as those which are described in my U. S. Patents Nos. 1,975,090; 1,975,091; and 1,975,092. While I may use a mechanical mixture of the aldehye with these hardwood denaturants, I prefer to introduce the aldehyde, along with the hardwood denaturant oils, into the upper portions of a bubble-cup fractionating column, where they are met by the ascending vapors of ethyl alcohol or of a mixture of ethyl alcohol and denaturing grade isopropanol, in the manner which is fully set forth in my Patent 1,975,091. One or more of the aldehydes may be used. The proportions may vary widely.

Example I

As an illustrative example, I may introduce into the column in metered proportions:

| | Percent by volume |
|---|---|
| 95% ethyl alcohol | 36.0 |
| Isopropanol (denaturing grade) | 24.0 |
| Light acid oil | 2.0 |
| Washed alcohol oil | 3.0 |
| Allyl alcohol fraction | 2.5 |
| Neutral oil | 2.5 |
| Acetone | 10.0 |
| Aldehyde | 20.0 |

The light acid oil and washed alcohol oil and the allyl alcohol fraction referred to are described in my U. S. Patent 1,975,091. Neutral oil is made by adding a 15.0% solution of sodium hydroxide to hardwood creosote oils and separating the wood oils which are insoluble in the sodium hydroxide solution. The separated oil is then given a vacuum distillation to stabilize it to a lemon-yellow color.

Other examples of the use of my novel aldehyde denaturants with hardwood denaturants follow:

Example II

| | Percent by volume |
|---|---|
| Ethyl alcohol | 34.75 |
| Isopropyl alcohol | 34.60 |
| Light acid and washed alcohol oils | 5.25 |
| Allyl alcohol fraction | 1.50 |
| Wood turpentine | 2.50 |
| Aldol | 8.40 |
| Paraldehyde | 10.00 |
| Ethyl acetate | 1.00 |
| Water | 2.00 |

Example III

| | Percent by volume |
|---|---|
| Ethyl alcohol | 45.38 |
| Isopropyl alcohol | 22.69 |
| Light acid and washed alcohol oils | 4.25 |
| Allyl alcohol fraction | 1.50 |
| Wood turpentine | 0.72 |
| Neutral oil from hardwoods | 2.75 |
| Aldol | 22.68 |

Example IV

| | Percent by volume |
|---|---|
| Ethyl alcohol | 22.65 |
| Isopropyl alcohol | 10.00 |
| Light acid and washed alcohol oils | 4.25 |
| Allyl alcohol fraction | 1.50 |
| Wood turpentine | 5.00 |
| Neutral oil from hardwoods | 2.00 |
| Aldol | 15.00 |
| Octyl alcohol | 10.00 |
| Ethyl acetate | 30.00 |

Example V

| | Percent by volume |
|---|---|
| Ethyl alcohol | 27.25 |
| Isopropyl alcohol | 10.00 |
| Light acid and washed alcohol oils | 4.25 |
| Allyl alcohol fraction | 1.50 |
| Wood turpentine | 5.00 |
| Neutral oil from hardwoods | 2.00 |
| Aldol | 10.00 |
| Ethyl acetate | 30.00 |
| Amyl-isoamyl alcohol mixture | 10.00 |

Example VI

| | Percent by volume |
|---|---|
| Ethyl alcohol | 32.25 |
| Isopropyl alcohol | 10.00 |
| Light acid and washed alcohol oils | 4.25 |
| Allyl alcohol fraction | 1.50 |
| Wood turpentine | 5.00 |
| Neutral oil from hardwoods | 2.00 |
| Aldol | 15.00 |
| Ethyl acetate | 30.00 |

Example VII

| | |
|---|---|
| Ethyl alcohol | 56.75 |
| Isopropyl alcohol | 10.00 |
| Light acid and washed alcohol oils | 4.25 |
| Allyl alcohol fraction | 1.50 |
| Wood turpentine | 5.00 |
| Neutral oil from hardwoods | 2.50 |
| Aldol | 10.00 |
| Picoline | 10.00 |

Moreover, my novel aldehyde denaturants may be used in conjunction with aliphatic ketones, or with ethers, or with a mixture of ketones and ethers, or with amino compounds, or with any other denaturants with which they may be found to be compatible. For instance, I may use the following combinations of denaturants:

Example VIII

| | Percent by volume |
|---|---|
| Light acid and washed alcohol oils | 4.00 |
| Allyl alcohol fraction | 3.00 |
| Isopropyl alcohol | 4.25 |
| Water | 1.50 |
| Di-isopropyl ether | 8.00 |
| Methyl propyl ketone | 61.75 |
| Paraldehyde | 19.00 |

Example IX

| | |
|---|---|
| Light acid and washed alcohol oils | 4.00 |
| Allyl alcohol fraction | 3.00 |
| Isopropyl alcohol | 28.75 |
| Water | 1.50 |
| Di-isopropyl ether | 10.00 |
| Paraldehyde | 52.75 |

Example X

| | Percent by volume |
|---|---|
| Light acid and washed alcohol oils | 4.00 |
| Allyl alcohol fraction | 3.00 |
| Isopropyl alcohol | 4.25 |
| Water | 1.50 |
| Methyl propyl ketone | 68.50 |
| Paraldehyde | 19.00 |

Example XI

| | |
|---|---|
| Di-isopropyl ether | 10 |
| Methyl propyl ketone | 70 |
| Paraldehyde | 20 |

Example XII

| | |
|---|---|
| Isopropyl alcohol | 15 |
| Di-isopropyl ether | 10 |
| Paraldehyde | 75 |

Example XIII

| | |
|---|---|
| Methyl propyl ketone | 80 |
| Paraldehyde | 20 |

Example XIV

| | |
|---|---|
| 95% ethyl alcohol | 31.25 |
| Isopropyl alcohol | 31.00 |
| Light acid oil | 2.25 |
| Washed alcohol oil | 3.00 |
| Allyl alcohol fraction | 2.50 |
| Aldol | 10.00 |
| Paraldehyde | 10.00 |
| Isopropyl ether | 10.00 |

From 0.5 to 5 parts, or even more, of any of the combinations mentioned above, may be used per 100 parts of 95% alcohol. When paraldehyde is used, not more than 1 part of the denaturant combination per 100 parts of 95% alcohol is necessary, although more may be used if desired.

What I claim as my invention and desire to be secured by Letters Patent of the United States is:

Industrial ethyl alcohol denatured with 0.5 to 5 parts of aldol, as an essential denaturing element, per 100 parts of 95% ethyl alcohol.

LOUIS J. FIGG, Jr.